United States Patent Office 3,438,865
Patented Apr. 15, 1969

3,438,865
PREPARATION OF BACTERIAL LIPOPOLYSACCHARIDES
Elizabeth Work and Kenneth William Knox, London, England, assignors to Twyford Laboratories Limited
No Drawing. Filed Aug. 30, 1966, Ser. No. 575,981
Claims priority, application Great Britain, Sept. 9, 1965, 38,522/65
Int. Cl. C12k 3/00
U.S. Cl. 195—96        10 Claims This invention is for improvements in or relating to bacterial lipopolysaccharides and has particular reference to a soluble phospholipid protein complex of a bacterial lipopolysaccharide and to a process for the preparation thereof.

The lipopolysaccharides (also known as endotoxins) are high molecular weight components of cells of Gram-negative bacteria. They are biologically active, possessing pyrogenic and toxic activity. Other more desirable biological properties of the lipopolysaccharides are antigenicity, stimulation of antibody production to other antigens and stimulation of non-specific resistance to various diseases. Non-specific resistance is the protection afforded by a microbial derivative against microorganisms not directly related to the bacteria from which the endotoxin is obtained.

Complexes of phospholipid, protein and lipopolysaccharide, often known as O-somatic antigens, can be extracted from bacterial cells by a variety of solvents (such as glycols or aqueous trichloroacetic acid). The yields are however extremely low, and the resulting products contain a variety of other substances such as proteins, polysaccharides and nucleic acids which are normally present in bacterial cells.

It is an object of the present invention to provide a soluble complex of phospholipid with protein-lipo-polysaccharide which is relatively pure and free from the contaminants mentioned above and which possesses the desirable biological properties of the lipopolysaccharides (also known as endotoxins) without certain of their disadvantages. Thus the complex of the present invention retains the more desirable properties such as stimulation of non-specific resistance to various diseases and in addition is less toxic and remains soluble even after lyophilisation making it more valuable for therapeutic applications.

Our copending application No. 550,608, filed May 17, 1966, claims a process for the preparation of a lipopolysaccharide which process comprises growing a lysine-requiring mutant of a Gram-negative species of bacteria in a sub-optimal concentration of lysine, obtaining a cell-free liquid from the resulting culture, separating lipopolysaccharide complex from the cell-free liquid, obtaining lipopolysaccharide by treatment of the complex with a mixture of a phenol and water and removing the phenol.

In our prior copending application No. 550,608, filed May 17, 1966, a phospholipid complex with protein-lipopolysaccharide could be obtained as a solid from the cell-free liquid only after partial dissociation with excess chloroform, change in pH or heating; material that then precipitated in the absence of dissolved chloroform was already insoluble and showed such undesirable biological properties as high pyrogenicity and toxicity. It could only be dissolved in aqueous solutions which contained small amounts of organic substances. Soluble material could be obtained by gel filtration, but this is a much less convenient method of isolation from large volumes of cell-free liquid. The complex form of lipopolysaccharide obtained by the process of the present invention which is relatively pure and substantially uncontaminated by other materials present in bacterial cells retains its more desirable biological properties such as stimulation of non-specific resistance and is less toxic, while remaining soluble even after lyophilisation.

The present invention provides a process for the preparation of a soluble complex of phospholipid with protein-lipopolysaccharide which process comprises growing a lysine-requiring mutant of a Gram-negative species of bacterium in a sub-optimal concentration of lysine, obtaining a cell-free liquid from the resulting culture, precipitating a complex of phospholipid with protein-lipopolysaccharide from the cell-free liquid by dissolving a polar water-immiscible organic compound in the cell-free liquid, separating the precipitated material and removing the organic compound to leave a water-soluble complex of phospholipid with protein-lipopolysaccharide.

The preferred Gram-negative species of bacterium is *Escherichia coli* which is grown in a sub-optimal concentration of lysine under conditions such that diaminopimelic acid accumulates in the culture medium.

The lysine concentration may vary from 20 to 500 mg./litre and the lysine-requiring mutant is preferably grown under conditions of high aeration. The pH of the culture may be between 5 and 8. The lysine-requiring mutant is preferably grown for from 16 to 48 hours at a temperature of from 25° to 40° C. Normally when lysine-requiring mutants of *Escherichia coli* are used the fermentation will be stopped at any convenient time except after growth has finally ceased.

The culture medium comprises a source of assimilable carbon, a source of assimilable nitrogen, inorganic salts and lysine. The source of assimilable carbon may be one or more carbohydrates such for example as glycerol, mannitol, glucose, sucrose, lactose and/or cane sugar molasses and/or one or more organic acids such for example as fumaric, citric and/or lactic acid. Glycerol is the preferred carbon source. The source of assimilable nitrogen may be, for example, ammonia, ammonium sulphate, ammonium chloride, ammonium phosphate, ammonium carbonate, ammonium acetate, a nitrate or urea. The inorganic salts may be, for example, potassium dihydrogen phosphate, potassium monohydrogen phosphate, magnesium sulphate and sodium sulphate. The lysine which is present in the medium may be added per se or, more usually, in the form of salt, such for example as the hydrochloride, or in the form of a material containing lysine as for example cornsteep liquor.

A preferred culture medium for the present invention has the composition in grams/litre of: $(NH_4)_2HPO_4$, 15; $KH_2PO_4$, 2; $MgSO_4.7H_2O$, 0.05; $Na_2SO_4.10H_2O$, 0.1; glycerol 20; L-lysine monohydrochloride 0.06.

The cell-free liquid may be obtained from the culture by, for example, centrifugation and thereafter freeing from bacteria by membrane filtration. The polar water-immiscible organic compound may be a halogenated hydrocarbon such for example as chloroform, trichloroethylene or methylene dichloride and may be added to the cell-free liquid and dissolved therein by agitation.

The lipid complex of the protein-lipopolysaccharide may be precipitated at room temperature directly from the cell-free liquid by addition of chloroform in amounts (determined for each growth) just insufficient to cause separation of a second phase of chloroform (usually up to 7%); alternatively the cell-free liquid can be first concentrated up to 5 times. When too much chloroform is added and a second phase separates, the yield of precipitate is lowered since some of the phospholipid is extracted into the chloroform. The mixture with chloroform may be agitated and left for at least 15 minutes, precipitated material is preferably separated by centrifugation. If desired the resulting supernatant solution may be treated again with chloroform and the resulting precipitate again centrifuged. The precipitated material may be resuspended in an aqueous medium preferably water or physiological saline solution or a solution containing one or more of the inorganic salts of the culture medium. The chloroform may be removed from the aqueous suspension by evaporation or bubbling through some inert gas or dialysis whereupon the lipopolysaccharide complex redissolves. Alternatively the chloroform may be removed directly from the precipitated material by evaporation.

If desired the lipopolysaccharide complex may be separated from low molecular-weight and other materials by repeated precipitation with the polar water-immiscible organic compound from an aqueous medium, sedimentation from an aqueous medium at 100,000 g., gel filtration (for example through Sephadex), ion exchange (e.g. through D.E.A.E. cellulose) or dialysis, or by washing the precipitated material with an aqueous medium saturated with the polar water-immiscible organic compound or by a combination of these methods.

Alternatively the material may be purified by adding 0.1% $MgSO_4$ whereupon 95% of the solid is precipitated from solution and can be recovered by any suitable means. It can be redissolved in 0.02 M ethylene diamine tetraacetic acid (or other chelating agent); if the Mg is completely removed by dialysis against EDTA (3 changes) and finally against water, a soluble material is finally obtained.

The phospholipid which precipitates in the complex is known to be mainly phosphatidylethanolamine. In certain circumstances spontaneous dissociation of the phospholipid complex may occur (for example if the fermentation is carried on too long), and the yield of chloroform-precipitated material may be considerably lowered. Yields may be increased in these circumstances if an excess of phosphatidylethanolamine or lecithin or some other cationic lipophilic compound (e.g. cetavlon) is added prior to chloroform; addition of these same compounds may also improve yield in the circumstances where a second phase has separated by addition of too much chloroform.

The soluble complex of phospholipid with protein-lipopolysaccharide of the present invention may be employed as an addition to vaccines whereby it increases immune reactions to the ingredients of the vaccines or as a preparation for increasing rapid resistance to an infection. It may also be employed as a source of lipopolysaccharide (by treating the soluble complex with a mixture of phenol and water) or any of the specific constituents of lipopolysaccharides such as 2-keto-3-deoxyoctonic acid or glyceromannoheptose. It may also serve as a substrate for enzyme reactions in which nucleotide sugars are added to phosphatidylethanolamine complexes of rough lipopolysaccharide chains.

Following is a description by way of example of methods of carrying the invention into effect.

EXAMPLE 1

E. coli strain ATCC 12408 was grown for 26 hours at 37° C. under conditions of high aeration in a sterile medium containing (g./l.) $(NH_4)_2HPO_4$, 15; $KH_2PO_4$, 2; $MgSO_4.7H_2O$, 0.05; $Na_2SO_4.10H_2O$, 0.1; glycerol 20; L-lysine monohydrochloride 0.06; pH adjusted to 7.0. 480 ml. of the overnight culture was used to inoculate 15 litres of the same medium contained in a stirred fermenter (30 l. capacity). The inoculated medium was incubated at 37° C. and air was passed in at the rate of 5 litres per minute. After 26 hours, the bacterial cells were removed from the culture by centrifugation and the supernatant fluid was freed from bacterial by membrane filtration.

4.5 litres of cell-free liquid was shaken with 1% (by volume) of chloroform and left to stand at room temperature overnight. The resulting precipitate was removed by centrifugation at 3,500 g. and suspended in water; chloroform was removed in vacuo at room temperature and an opalescent viscous solution resulted. The yield of lyophilised material was 2.30 g. and the resulting complex of phospholipid with protein-lipopolysaccharide contained 8.6% heptose; after removal of low molecular-weight substances by dialysis, heptose content was 11.2% and N was 3.1%, protein 11%, extractable lipid 26%. Further purification by sedimentation by ultracentrifugation at 100,000 g gave a gelatinous deposit containing 12.6% heptose.

EXAMPLE 2

The procedure of Example 1 was repeated but the culture was only grown for 18 hours. 1.2 g. of the material precipitated from the cell-free liquid and removed by centrifugation at 3,500 g was purified by suspending in water containing 1% chloroform and recentrifuging at 3,500 g; the supernatant was removed and the precipitate dispersed in water and chloroform removed in vacuo at room temperature. 0.7 g. was obtained of the complex of phospholipid with protein-lipopolysaccharide. It contained 3.1% N, 11.5% heptose, 28% extractable phospholipid. After lipid extraction, the residue contained 4.2% N and all the amino acids of a protein.

EXAMPLE 3

The procedure of Example 1 was repeated but the culture was only grown for 21 hours.

10 litres of the cell-free liquid was shaken with 1.25% chloroform and left to stand at room temperature overnight. The resulting precipitate was removed by centrifugation at 3,500 g and suspended in water (200 ml.), chloroform was removed in vacuo and the solution centrifuged for 1 hour at 100,000 g; the gelatinous deposit was dispersed in 100 ml. of water and resedimented. The resulting yield of 1.5 g. of purified complex of phospholipid with protein-lipopolysaccharide contained 11.6% heptose and 28% extractable lipid. 270 mg. of the purified complex dissolved in 10 ml. of water was treated with 0.5 ml. of 10% $MgSO_4.7H_2O$. The precipitate was collected by centrifugation, dissolved in 0.2 M E.D.T.A., dialysed against 0.01 m E.D.T.A. and then water. 218 mg. of purified complex of phospholipid with protein-lipopolysaccharide contained 12.2% heptose and 29% extractable lipid and 10% protein.

The lipopolysaccharide complex prepared by these methods reacted with antisera prepared against whole cells or walls of E. coli 12408 or against the lipopolysaccharide complex. Toxicity for mice weighing 15 to 20 grams sensitised 6 days previously by a dose of $1.5 \times 10^9$ killed Haemophilus influenzeae cells was compared with that of lipopolysaccharide and protein-lipopolysaccharide (the complex after removal of extractable lipid); $LD_{50}$ phospholipidprotein-lipopolysaccharide, 2 mg.; protein-lipopolysaccharide, 0.9 mg.; lipopolysaccharide, 0.3 mg.

EXAMPLE 4

Fifteen litres of cell-free liquid prepared as in Example 1 was found by analysis of carbohydrate excluded by Sephadex G–75 to contain a total of 15.35 g. of lipopolysaccharide complex. It was agitated vigorously and 300 ml. of chloroform was added over 10 minutes. The mixture stood at room temperature for 16 hours and was centrifuged in a Sharples centrifuge. The clear supernatant solution, containing 5.62 g. of lipopolysaccharide complex was treated again with chloroform (450 ml.), and the resulting precipitate was again centrifuged; 94% of the original lipopolysaccharide complex had been removed from the supernatant solution. The two precipitates were pooled and suspended in water (1 l.) and the chloroform was removed in vacuo at a temperature below 35° C. The solution was dialysed for 4 days against 3 changes of water and lyophilised, yielding 15 g. of complex. This contained 24% extractable lipid, 10.3% protein, 11.2% heptose, 6.4 glucose, 3.3% P, 3.1% N. On injection into rabbits it gave an antiserum precipitating strongly with the complex and also with pure lipopolysaccharide. $LD_{50}$ for 5-day old chick embryos was 8.5 μg. $LD_{50}$ for mice (weighing 20 g.) was 750 μg.

8 g. of lipopolysaccharide complex, after removal of extractable lipids, was dissolved in 400 ml. of water at 65° C. and mixed with 400 ml. of aqueous 90% (w./v.) phenol at 65° C. The mixture was stirred at 65° C. for 20 minutes, cooled to +4° C. and the resulting two phases separated by centrifuging at 4° C. The lower phenol layer was extracted with 500 ml. of water under the same conditions; the pooled aqueous (top) layers were extracted twice with 300 ml. of ethyl ether to remove the phenol and then concentrated to 500 ml. in vacuo below 37° C. Ethanol (10 vol.) was added together with a few mg. of sodium acetate and the mixture was left overnight. The precipitate of lipopolysaccharide was filtered and washed with ethanol (5.77 g.). It contained 18.4% heptose, 10.6% glucose, 6.7% hexosamine, 3.88% organic phosphorus, 17.6% of Lipid A (liberated by mild acid hydrolysis). The main fatty acids were lauric 29%, myristic 18%, β-OH myristic 43%. $LD_{50}$ for 5-day old chick embryo was 2.0 μg. $LD_{50}$ for mice (weighing 20 g.) was 250 μg. using another preparation made similarly.

EXAMPLE 5

Twelve litres of cel-free liquid, prepared as in Example 1, was treated under agitation with 480 ml. of trichloroethylene. After standing overnight at room temperature the precipitate was centrifuged, suspended in water and the trichlorethylene removed in vacuo at a temperature below 35° C. The solution was dialysed and lyophilised yielding 10.65 g. of lipopolysaccharide complex having the following analysis: protein 14%, heptose 9.1%, glucose 9.1%, extractable phospholipid 30%.

EXAMPLE 6

1½ litres of cell-free liquid prepared as in Example 1, was shaken with 150 ml. of tetrachlorethane and left to stand overnight at room temperature. The precipitate was centrifuged and suspended in 100 ml. of water and tetrachlorethane was removed by dialysis. Half the solution was lyophilised, yielding 0.353 g. of lipopolysaccharide complex containing 10.7% protein, 6.7% glucose, 3.86% total organic phosphorus, 20% extractable lipid. The other half of the dialysed solution of lipopolysaccharide complex was heated to 67° C., mixed with 50 ml. of 90% (w./v.) phenol at 67° C. and stirred at 67° C. for 10 minutes. The mixture was cooled to +4° C. and centrifuged to separate the two phases. The top aqueous layer was collected and the solution was dialysed free of phenol, giving a solution of lipopolysaccharide which contained 11% glucose and 17.7% heptose (on a dry weight basis).

EXAMPLE 7

100 ml. of cell-free liquid, prepared as in Example 1, was shaken with 10 ml. of methylene dichloride and the mixture stood overnight at room temperature. The precipitate was centrifuged, suspended in water and the methylene dichloride was removed in vacuo at a temperature below 35° C. The resulting solution was dialysed and lyophilised yielding .078 g. of lipopolysaccharide complex having the following analysis: protein 10%, glucose 7.14%, heptose 10.5%, total organic phosphorus 3.05%, extractable lipid 30%.

We claim:
1. A process for the preparation of a soluble complex of phospholipid with protein lipopolysaccharide which process comprises growing a lysine-requiring mutant of *Escherichia coli* in a sub-optimal concentration of lysine, obtaining a cell-free liquid from the resulting culture, precipitating a complex of phospholipid with protein-lipopolysaccharide from the cell-free liquid by dissolving a polar water-immiscible organic compound in the cell-free liquid, separating the precipitated material and removing the organic compound to leave a water-soluble complex of phospholipid with protein-lipopolysaccharide.

2. A process as claimed in claim 1 wherein the *Escherichia coli* is grown in a sub-optimal concentration of lysine under conditions such that diaminopimelic acid accumulates in the culture medium.

3. A process as claimed in claim 2 wherein the lysine concentration is between 20 and 500 mg./litre and the lysine-requiring mutant is grown under conditions of high aeration.

4. A process as claimed in claim 3 wherein the pH of the culture is between 5 and 8 and the lysine-requiring mutant is grown for 16 to 48 hours at a temperature of from 25° to 40° C.

5. A process as claimed in claim 1 wherein the polar water-immiscible organic compound is a halogenated hydrocarbon.

6. A process as claimed in claim 5 wherein the halogenated hydrocarbon is chloroform, trichlorethylene or methylene dichloride.

7. A process as claimed in claim 1 wherein the lipopolysaccharide complex is separated from low molecular weight and other materials by repeated precipitation with the polar water-immiscible organic compound from an aqueous medium, sedimentation from an aqueous medium at 100,000 g, gel filtration, ion exchange or dialysis, or by washing the precipitated material with an aqueous medium saturated with the polar water-immiscible organic compound.

8. A process as claimed in claim 1 wherein the lipopolysaccharide complex is purified by adding an alkaline-earth metal salt, the resulting precipitated complex is dissolved in a chelating agent, and metal, chelating agent and any other low molecular weight material present are then separated by dialysis or gel filtration to leave substantially pure soluble complex of phospholipid with protein-lipopolysaccharide.

9. A process as claimed in claim 8 wherein the chelating agent is ethylene diamine tetraacetic acid.

10. A process as claimed in claim 1 wherein the soluble complex of phispholipid with protein-lipopolysaccharide is treated to obtain lipopolysaccharide with a mixture of a phenol and water and thereafter the phenol is removed.

References Cited

UNITED STATES PATENTS 3,148,120  9/1964  Westphal.

ALVIN E. TANENHOLTZ, *Primary Examiner.*

U.S. Cl. X.R.

195—31; 424—92